(12) United States Patent
Gojkovic

(10) Patent No.: US 11,211,837 B2
(45) Date of Patent: Dec. 28, 2021

(54) ACTUATOR WITH INDIVIDUALLY COMPUTERIZED AND NETWORKED ELECTROMAGNETIC POLES

(71) Applicant: General Dynamics Mission Systems—Canada, Ottawa (CA)

(72) Inventor: Mark Gojkovic, Ottawa (CA)

(73) Assignee: General Dynamics Land Systems—Canada, Ottawa (CA)

( * ) Notice: Subject to any disclaimer, the term of this patent is extended or adjusted under 35 U.S.C. 154(b) by 27 days.

(21) Appl. No.: 16/452,103

(22) Filed: Jun. 25, 2019

(65) Prior Publication Data

US 2020/0412184 A1 Dec. 31, 2020

(51) Int. Cl.
| | |
|---|---|
| *H02K 1/24* | (2006.01) |
| *H02K 11/22* | (2016.01) |
| *H02K 11/33* | (2016.01) |
| *G01D 5/347* | (2006.01) |
| *H02K 1/14* | (2006.01) |
| *H02K 1/16* | (2006.01) |

(Continued)

(52) U.S. Cl.
CPC ............ *H02K 1/24* (2013.01); *G01D 5/3473* (2013.01); *H02K 1/14* (2013.01); *H02K 1/16* (2013.01); *H02K 3/18* (2013.01); *H02K 11/22* (2016.01); *H02K 11/33* (2016.01); *H02K 17/30* (2013.01)

(58) Field of Classification Search
CPC .. H02K 1/24; H02K 1/14; H02K 1/16; H02K 11/22; H02K 11/33; H02K 11/30; H02K 11/35; H02K 3/18; H02K 17/30; H02K 17/22; H02K 17/24

USPC ...................... 310/216.01, 216.001
See application file for complete search history.

(56) References Cited

U.S. PATENT DOCUMENTS

| | | | |
|---|---|---|---|
| 3,832,610 A | * | 8/1974 | Shimizu ................. H02K 41/03 318/135 |
| 4,353,446 A | | 10/1982 | Pietzsch |
| 4,501,980 A | | 2/1985 | Moritake et al. |

(Continued)

FOREIGN PATENT DOCUMENTS

| | | |
|---|---|---|
| CN | 102494020 A | 6/2012 |
| DE | 2240569 B1 | 1/1974 |

(Continued)

*Primary Examiner* — Michael Andrews
(74) *Attorney, Agent, or Firm* — LKGlobal | Lorenz & Kopf, LLP

(57) ABSTRACT

A direct drive drive actuator includes a base structure and a driven structure that is journally supported and translatable relative to the base structure. The driven structure is disposed in a fixed spacial relationship to the base structure. A plurality of first pole arrays is disposed on the driven structure. A plurality of second pole arrays, corresponding in number to the plurality of first pole arrays is disposed on the base structure. An electrical power source is provided. A controller is coupled to the power source and the first plurality of pole arrays and the second plurality of pole arrays, wherein the controller is configured to selectively electrically energized windings of the first plurality of pole arrays and the second plurality of pole arrays such that an electro-magnetic force is formed between poles of the first plurality of pole arrays and poles of the second plurality of pole arrays. The driven structure is translatable relative to the base structure responsive to the electro-magnetic force.

21 Claims, 8 Drawing Sheets

(51) Int. Cl.
*H02K 3/18* (2006.01)
*H02K 17/30* (2006.01)

(56) References Cited

U.S. PATENT DOCUMENTS

| | | |
|---|---|---|
| 4,714,853 A | 12/1987 | Palmero et al. |
| 5,974,940 A | 11/1999 | Madni et al. |
| 6,163,091 A * | 12/2000 | Wasson ................ H02K 41/03 |
| | | 310/12.19 |
| 6,486,582 B1 | 11/2002 | Patarchi |
| 6,717,312 B1 * | 4/2004 | Kaplan ................ H02K 7/088 |
| | | 310/254.1 |
| 6,762,520 B1 | 7/2004 | Ehrhart et al. |
| 7,352,096 B2 | 4/2008 | Dunn et al. |
| 8,299,670 B2 | 10/2012 | Krumme |
| 8,796,893 B2 | 8/2014 | Muth et al. |
| 9,174,728 B2 | 11/2015 | Altmikus et al. |
| 9,866,154 B2 | 1/2018 | Bi et al. |
| 2004/0150289 A1 * | 8/2004 | James ................ H02K 19/04 |
| | | 310/261.1 |
| 2004/0200345 A1 | 10/2004 | Hartmann et al. |
| 2010/0254640 A1 * | 10/2010 | Muth ................ A61B 6/035 |
| | | 384/107 |
| 2020/0313521 A1 * | 10/2020 | Coonrod ................ H02K 11/35 |

FOREIGN PATENT DOCUMENTS

| | | |
|---|---|---|
| DE | 3213172 A1 | 10/1983 |
| DE | 102004014640 A1 | 11/2005 |
| EP | 0245749 A2 | 11/1987 |
| EP | 0245749 A3 | 10/1988 |
| EP | 2071708 A1 | 6/2009 |
| FR | 1163176 A | 9/1958 |
| FR | 2787256 A1 | 6/2000 |
| WO | 02093720 A1 | 11/2002 |
| WO | 2015165508 A1 | 11/2015 |
| WO | 2018106910 A1 | 6/2018 |

\* cited by examiner

ACTUATOR WITH INDIVIDUALLY COMPUTERIZED AND NETWORKED ELECTROMAGNETIC POLES

TECHNICAL FIELD

This patent relates to electric direct drive actuators. In particular, this patent relates to a multi-pole, electronically-commutated, circular or linear actuator configured to directly drive a driven structure relative to a base structure.

BACKGROUND

Actuators, both linear and circular, are commonly used to articulate a driven structure relative to a base structure. Exemplary applications include articulation of crane structures relative to self-propelled bases or gantries, weapon systems structures (stabilized gun turrets, missile launchers, gun mounts), radar domes, antenna arrays, industrial robots, telescopes, part of any machine (e.g. mining, excavation) and the like.

Typical motor driven actuators consist of electric or hydraulic motors with a single point of contact to a rotor structure via a torque multiplying gearbox/transmission. Ignoring the high costs related to specialized materials and treatments, the gearing introduces non-linearities (such as backlash, static friction and mechanical compliance) that limit the practical dynamic bandwidth of the system. Typical small-frame electric motors lack the sufficient torque or overall stiffness to achieve high bandwidth in geared drives, while the hydraulic motors are difficult to integrate and control.

Proposed direct drive actuators eliminate geared drives. However, these arrangements rely on expensive permanent magnet motors, and notwithstanding the elimination of the geared drive, still lack bandwidth, instantaneous starting/stopping torque and slow speed precision improvements that could be realized through the use of individually-controlled electromagnet poles.

Accordingly, arrangements are desired for improved actuators that address one or more of the above challenges.

BRIEF SUMMARY

A direct drive drive actuator includes a base structure and a driven structure that is journally supported and translatable relative to the base structure. The driven structure is disposed in a fixed spacial relationship to the base structure. A plurality of first pole arrays is disposed on the driven structure. A plurality of second pole arrays, corresponding in number to the plurality of first pole arrays is disposed on the base structure. An electrical power source is provided. A controller is coupled to the power source and the first plurality of pole arrays and the second plurality of pole arrays, wherein the controller is configured to selectively electrically energize windings of the first plurality of pole arrays and the second plurality of pole arrays such that an electro-magnetic force is formed between poles of the first plurality of pole arrays and poles of the second plurality of pole arrays. The driven structure is translatable relative to the base structure responsive to the electro-magnetic force.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In accordance with the herein described embodiments, the challenges of existing actuator systems are overcome by using a direct drive actuator requiring no gearbox and capable of producing large instantaneous starting torques. As a result, such systems achieve higher bandwidth and accuracy. When applied to inertially-stabilized weapon systems, for example, the higher bandwidth and accuracy provide significant advantages to the disturbance-rejection performance of the stabilized system. The rotor and stator poles are held in fixed spaced relationship, and the actuator is non-contact thus reducing wear and required maintenance.

In further accordance with the herein described embodiments, a control structure incorporating electronics and control algorithms precisely commutate the actuator. The actuator includes a plurality of electromagnet pole arrays with each pole array being controlled by a dedicated circuit allowing for precise control of the direction and strength of the generated magnetic field. Both the rotor and the stator portions of the actuator are equipped with a high-resolution optical encoder providing positional and speed reference to the control electronics. Electronics on the rotor and the stator portions communicate with each other through a dedicated slip ring or through a high-speed wireless structure incorporated into the actuator. Additionally, actuators according to the herein described embodiments use non-contacting parts which decreases wear, increases life-span and increases overall long-term reliability.

Figure 1:
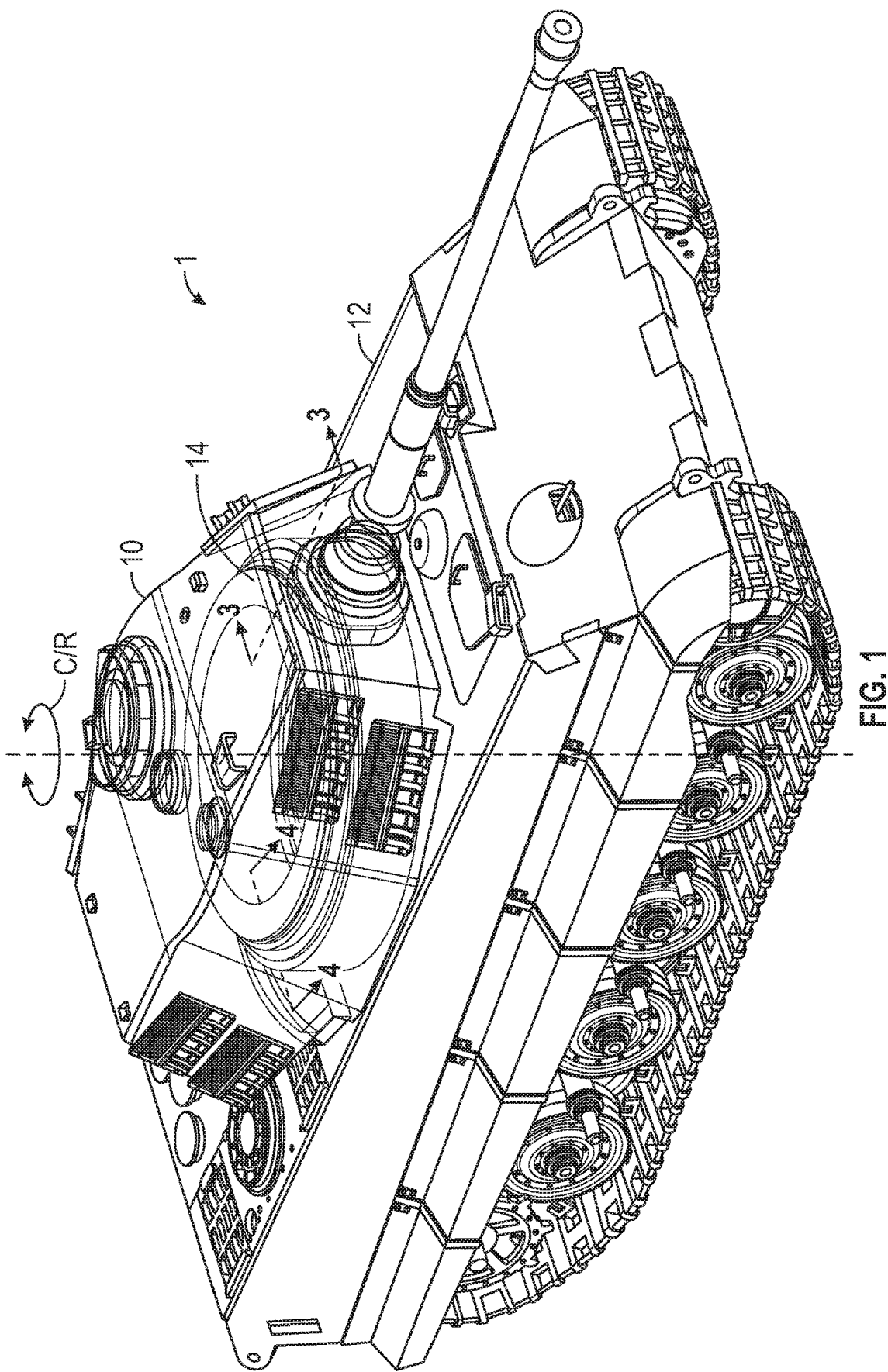
FIG. 1 is graphic depiction of an exemplary application of an actuator in accordance with the herein described embodiments.

Referring now to FIG. 1, a driven structure 10 depicted as a turret is mounted to a base structure 12, depicted as a self-propelled tracked portion of a vehicle 1. A direct drive actuator 14 (hereinafter actuator 14) is operably disposed between and rotatably secures the driven structure 10 and the base structure 12. Operation of the actuator 14 rotates the driven structure 10 relative to the base structure about a central axis of rotation "c/r." While depicted as a turret, it will be appreciated that the driven structure 10 may be a crane secured for rotation to a self-propelled or fixed base, a telescope secured to a base, an industrial robot secured to a base or virtually any other structure or device that might be caused to rotate relative to a base during operation. In further embodiments, the actuator may have a linear configuration, and the driven structure 10 may be driven linearly along the base structure 12, for example, in an embodiment where a crane is driven linearly along a gantry. As such, it will be appreciated that the actuator 14 may be configured for rotation or linear translation, as the case may be for the particular application. For the sake of brevity, in the remainder of this disclosure the actuator 14 is described as having a circular configuration to affect rotation of the driven structure 10 relative to the base structure 12.

Figure 2:
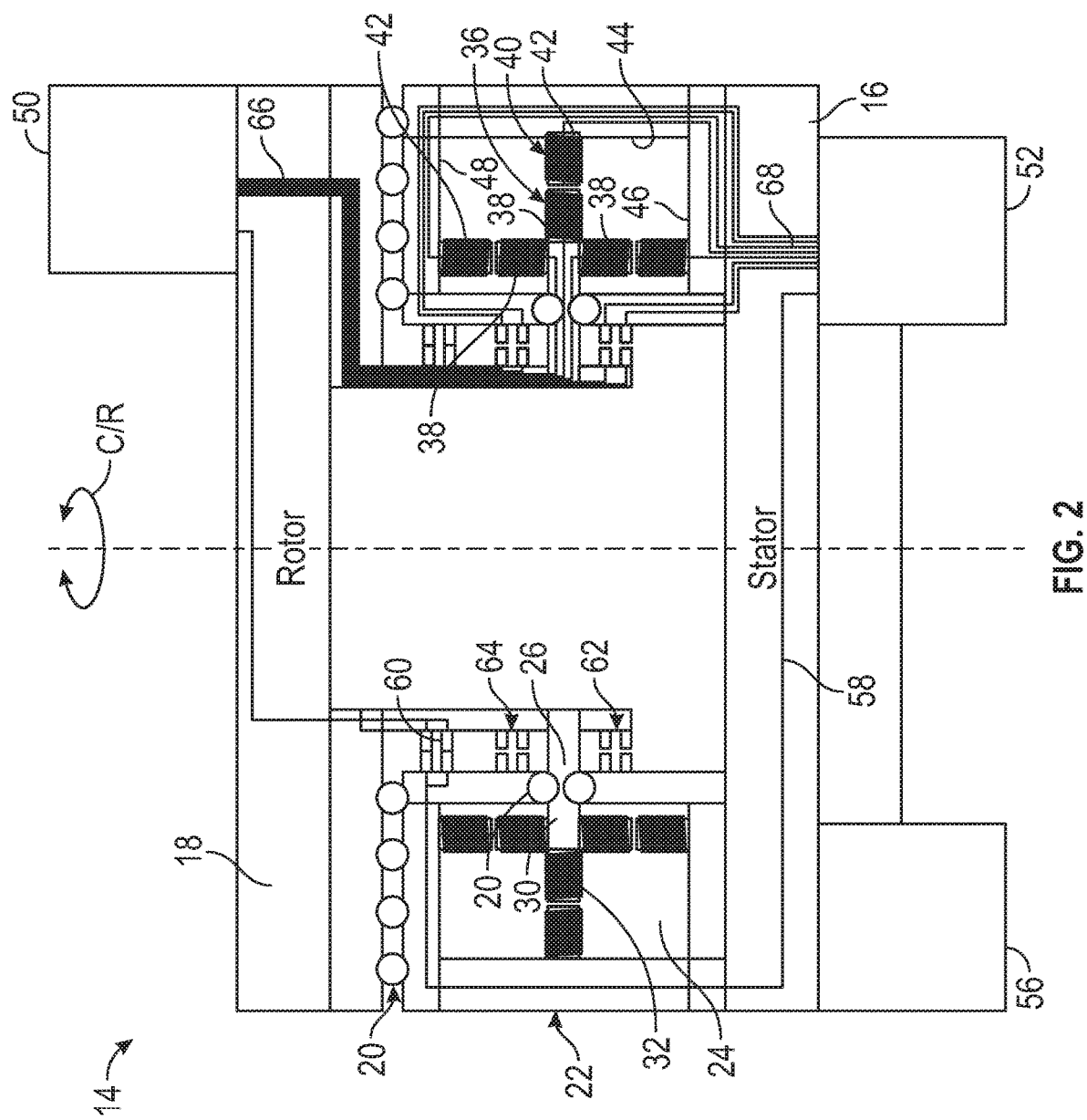
FIG. 2 is a block diagram illustration of an actuator system in accordance with the herein described embodiment.
Figure 3:
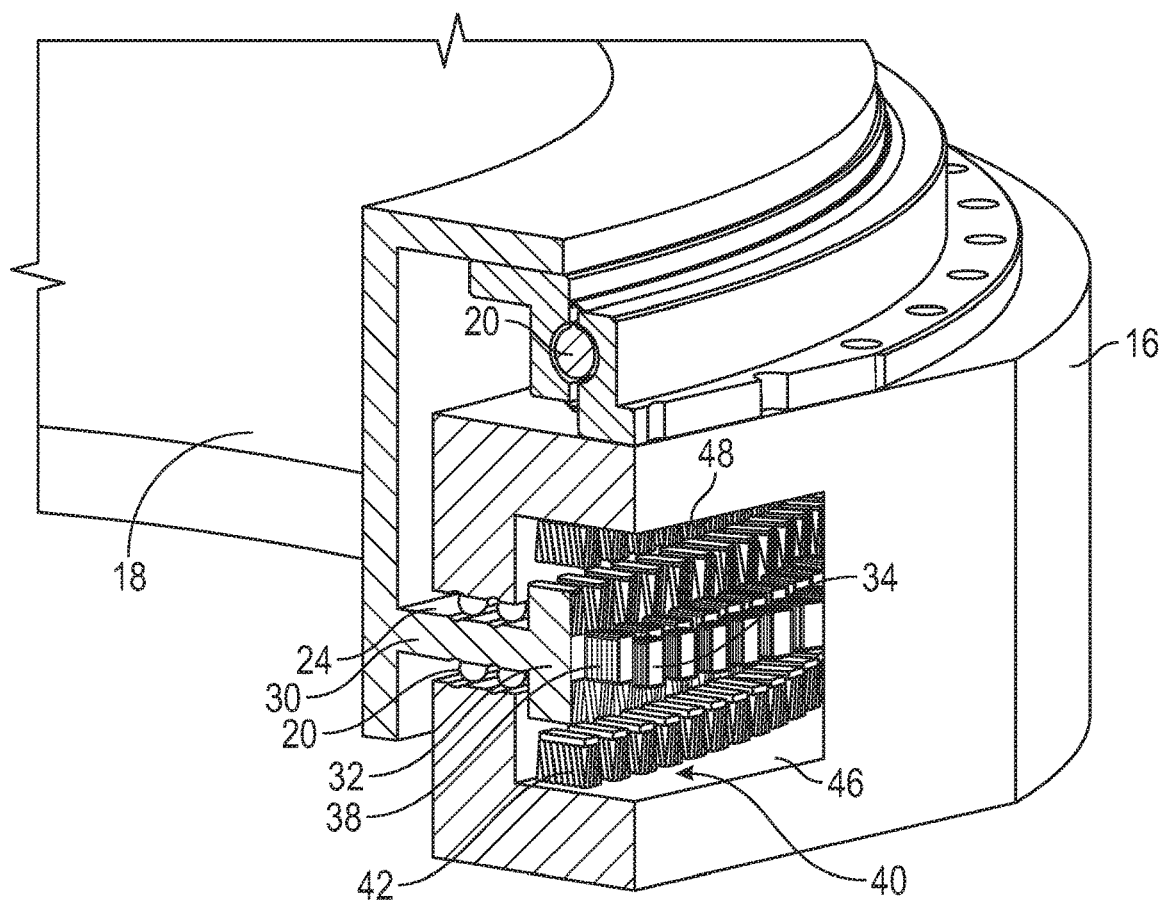
FIG. 3 is a partial cross-sectional view taken along line 3-3 of FIG. 1.
Figure 4:
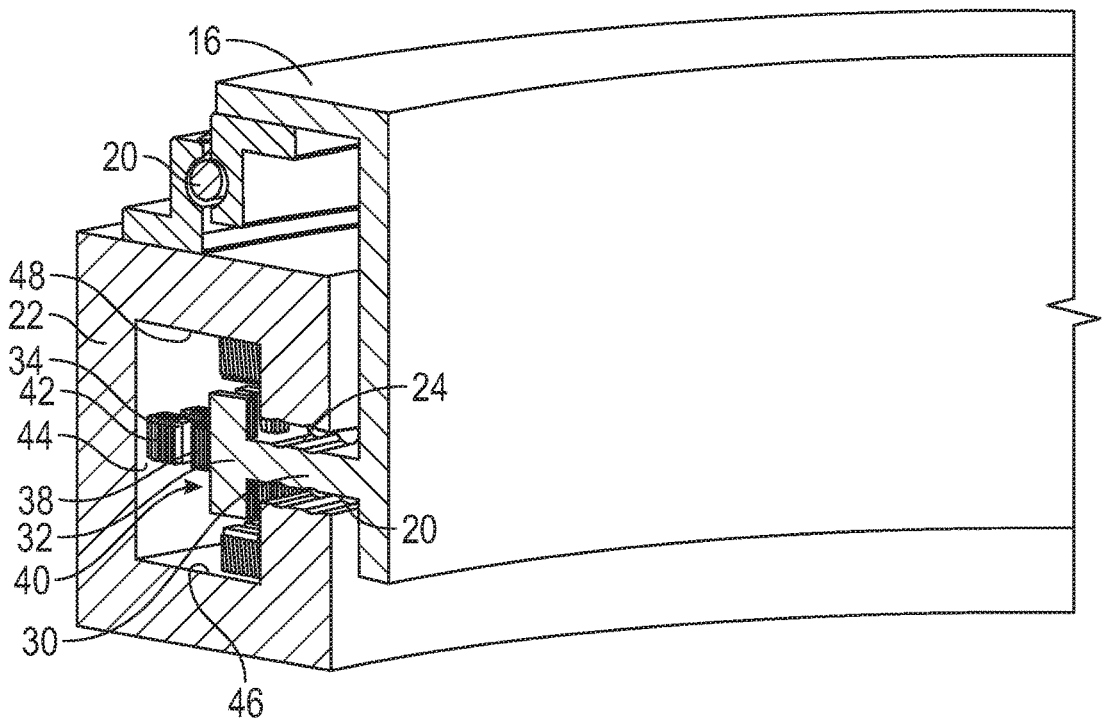
FIG. 4 is a partial cross-sectional view taken along line 4-4 of FIG. 1.

With reference to FIGS. 2-4, the actuator 14 includes a stator 16 and a rotor 18. The rotor 18 is mounted via axial and radial bearings 20 for rotation relative to the stator 16. The bearings 20 while shown as ball bearings, may have any suitable configuration taking into account that a rotor 18 is to be supported so as to maintain a tightly controlled air gap between the stator 16 and the rotor 18. Taking this requirement into account, other suitable bearing structures including roller, magnetic, air and the like may be used. The stator 16 is suitably mechanically coupled to the base structure 12, such as by fasteners, welding or the like (not depicted) and the rotor 18 is similarly, suitably mechanically coupled to the driven structure 10. In alternative arrangements, the stator 16 may be formed integrally with the base structure 12 as may the rotor 18 be formed integrally with the driven structure 12.

As depicted in FIGS. 3 and 4, the stator 16 is formed as a "C" shaped cross-section 22 forming a cylindrical cavity 24 with an opening 26 disposed toward the central axis c/r of the actuator 14. It will be understood that other suitable configurations may be used. It will be further understood that while the stator 16 is depicted herein as an integral structure, it may be formed as an assembly of structural elements. In embodiments where the stator 16 is formed to include a cavity, the cavity may be filled with a non-electrically conductive, thermally conductive gel.

The rotor 18 is formed with a flange 30 extending radially outward from the central axis c/r and extending through the opening 26 and into the cavity 24. An end 32 of the flange is formed in a "T" configuration, that is with arms arranged at 90° to each other. While the rotor 18 is depicted in the figures as being disposed radially inward of the stator 16, a configuration wherein the rotor is disposed radially outward of the stator 16 or axially displaced from the stator 16 are well within the contemplated embodiments, and in such a configuration the flange 30 may be formed to extend radially inward or axially.

Formed on the flange 30 are a plurality of pole arrays 36. In an exemplary embodiment, 720 pole arrays 36 are provided, but it will be understood that more or fewer pole arrays 36 may be provided. More pole arrays equate to more bandwidth. A pole array 36 consists of one or more windings 38 disposed on the flange 30. As depicted, each pole array 36 includes three (3) windings 38 with a winding disposed on a magnetically permeable arm of the "T" shaped flange end 32. A corresponding plurality of pole arrays 40 are disposed on the stator 16 within the cavity 24. In accordance with the depicted embodiment, each pole array 40 includes three windings 42, one disposed on a radial outward wall 44 and one each disposed on an axial upper and lower wall 46 and 48, as the walls are depicted in the figures. The windings 42 may be formed around suitable magnetically permeable cores 34 formed within the cavity 24 or secured to the walls of the cavity 24.

With reference again to FIG. 2, a control unit structure for the actuator 14 includes a rotor power distribution and controller (controller 50) and a stator power distribution and controller (controller 52). Electrical power is provided by a power source 56, which may include one or more power generating sources, such as generators or alternators, and one or more storage sources, such as batteries, capacitors and the like. A power bus 58 couples power to the controller 52, and via a power slip ring 60 to the controller 50. The controller 50 is coupled at least to a communication interface 62, a position encoder 64 and the pole arrays 36 via a power and data bus 66. Similarly, the controller 52 is coupled to the communication interface 62, the position encoder 64 and pole arrays 40 via a power and data bus 68. The data buses 66 and 68 may be configured in accordance with any suitable standard such as Controller Area Network (CAN), Time-Triggered Protocol (TTP), Low Voltage Differential Signaling (LVDS), FlexRay, Ethernet, EtherCAN, or the like serial communication protocol.

Each of the controllers 50 and 52 may include a digital central processing unit (CPU) in communication with a memory system and internal communication and power structures, as is well known. Each CPU is configured to execute instructions stored as a program in the memory system, and to send and receive signals to/from the buses 66 and 68. The memory system may include various storage types including optical storage, magnetic storage, solid-state storage, and other non-volatile memory. The buses 66 and 68 may be configured to send, receive, and modulate analog and/or digital signals to/from the communication interface 62, the position encoder 64, the pole arrays 36 and 40 and associated pole array controllers (see controllers 70 in FIG. 5). The program may embody the methods disclosed herein, allowing the CPU to carryout the steps of such methods and to control the actuator 14.

The program stored in the memory system may be transmitted to the controllers 50 and 52 via a cable or in a wireless interface. The program may be conventional computer program product, which is also called computer readable medium or machine readable medium, and which should be understood to be a computer program code residing on a carrier, whether transitory or non-transitory in nature, with the consequence that the computer program product can be regarded to be transitory or non-transitory in nature.

An example of a transitory computer program product is a signal, e.g. an electromagnetic signal, which is a transitory carrier for the computer program code. Carrying such computer program code can be achieved by modulating the signal by a conventional modulation technique for digital data, such that binary data representing the computer program code is impressed on the transitory electromagnetic signal. Such signals may be made use of when transmitting computer program code in a wireless fashion via a WiFi connection from/to a laptop computer or other computing device.

In the case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an application specific integrated circuit (ASIC), a CD or DVD or the like.

Instead of CPUs, the controllers 50 and 52 may have a different type of processor to provide the electronic logic, e.g. an embedded controller, an onboard computer, or any processing module that might be deployed in association with the actuator 14.

The structure of the controllers 50 and 52 and associated components provide a sufficiently fast electronics and control platform providing the high-bandwidth, reliable and inherently redundant data and power communications between the driven structure 10, the base structure 12 and the actuator 14. While depicted as separate controllers 50 and 52, the rotor controller 50 and the stator controller 52 may be implemented as a single controller, and/or as more than two controllers. Furthermore, while not depicted, a user or autonomous control is coupled to the controllers 50 and 52, which are responsive to data generated by and received from such control to drive the driven structure 10 relative to the base structure 12 via control of the actuator 14.

Figure 5:
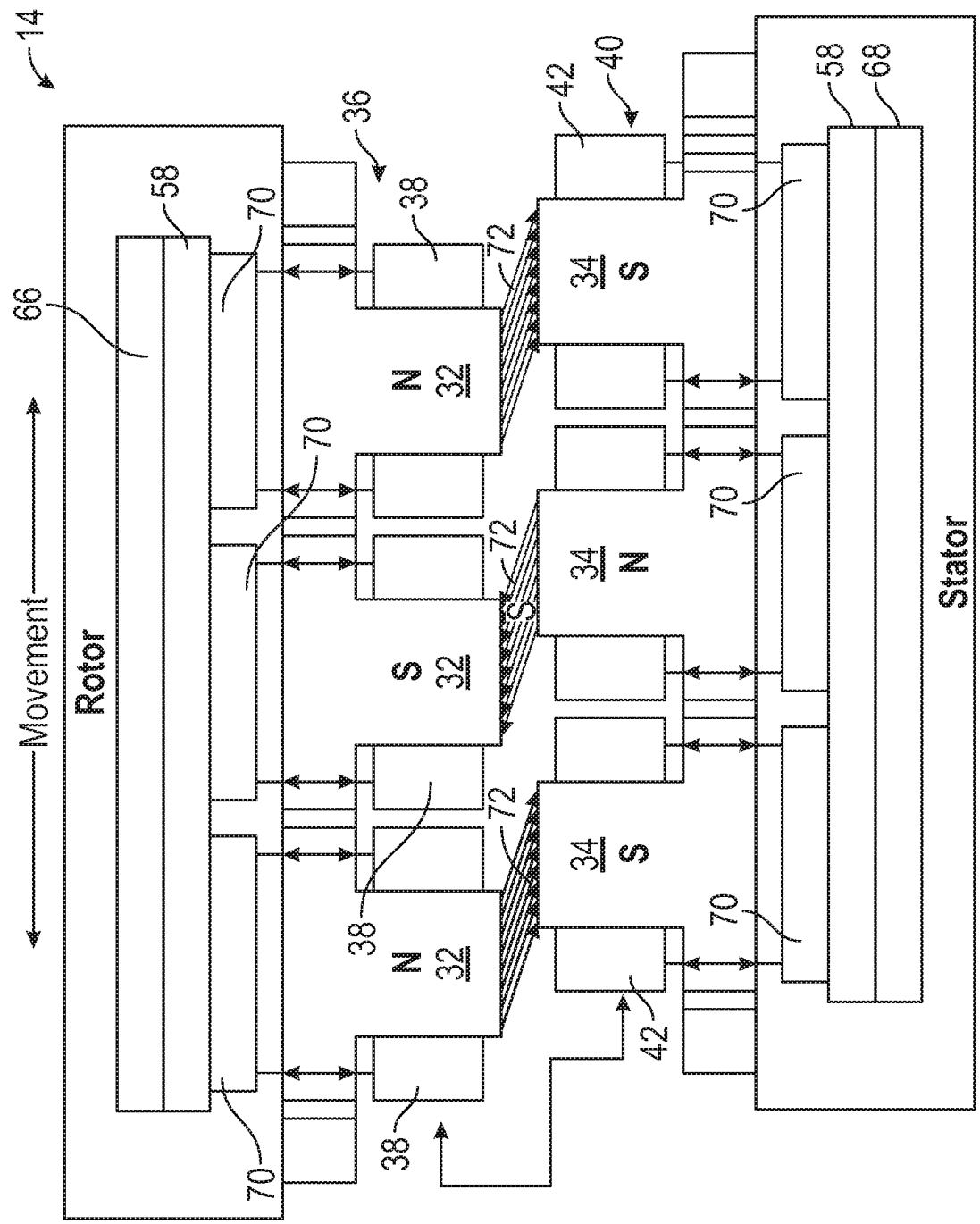
FIG. 5 is a schematic illustration of an actuator system depicted in FIG. 2 depicting induced electro-magnetic forces.

With reference to the schematic illustration of FIG. 5 operation of the actuator 14 can be described. In accordance with the herein described embodiments, each of the windings 38 of the pole arrays 36 and each of the windings 42 of the pole arrays 40 are individually controlled via the controllers 50 and 52, respectively, to generate a commutative electro-magnetic force. A switching control, for example an H-Bridge control 70 as shown in FIG. 5 is associated with each of the windings 38 and 42 and is coupled to the respective controller 50 and 52. Responsive to control signals, the H-bridge controls 70 energize the windings 38 and 42 to generate motive or braking electro-magnetic forces 72, e.g., commutative forces, by creating opposing magnetic poles between the pole arrays 36 and 40.

The number of pole arrays 36 and 40, in exemplary embodiments 720 pole array pairs, i.e., 720 pole arrays 36 and corresponding 720 pole arrays 40, or in alternative embodiments the number of pole pairs may be based upon a ratio of the diameter of the actuator. For example, a suitable number of pole pairs may be selected as being equal to twenty (20) times the diameter of the actuator in inches, or another suitable relationship. The number of pole pairs relates to the both the magnitude of driving and braking torque that is required to be generated as well as the accuracy to which the driven structure 10 can be positioned. Owing to the number of pole array pairs and the ability to vary the field strength and direction of each pole, the actuator provides both an ability to accelerate and decelerate quickly, to increase the rate of angular (or as the case may be linear) translation as well as to execute very slow motion translation and motion stabilization with high precision and minimal torque ripple.

To provide and maintain accurate positioning, the controllers 50 and 52 continuously sample data from the position encoder 64. In exemplary embodiments, the position encoder 64 may be a 24-bit optical encoder, although the application will inform the required resolution. The position encoder 64 is shown coupled by the buses 66 and 68 to the controllers 50 and 52. Data from the position encoder 64 may otherwise be coupled via the communication interface 62 to the controllers 50 and 52.

High speed, reliable data communication to and between the controllers 50 and 52 is necessary to maintain proper operation of the actuator 14, and in particular, the selective energization of the windings 38 and 42 of the pole arrays 36 and 40 via the controllers 50 and 52. The communication interface 62 is selected to be high-speed, for example gigabit speed, short range wireless communication. Selected based upon data rate, encryption and interference rejection requirements, the communication interface may be an IEEE 802.X.X, Personal Area Network (PAN), Bluetooth or infrared (IR) wireless and the like based wireless communication protocol.

The configuration: number, spacing and winding arrangement of the pole arrays 36 and pole arrays 40 may be such to inherently balance radial and axial forces between the stator 18 and rotor 16 during operation of the actuator 14 and, may furthermore actively cancel force vectors unrelated to translation of the rotor 18. As will be appreciated, the pole arrays 36 and 40 require a corresponding number of windings. However, it is possible to provide more or fewer windings in the pole arrays 36 and 40, and it should be understood that in certain configurations the axial and radial forces may not be balanced and the mechanical structure, for example, the configuration of the bearings 20 may be required to account for the potential force differential. Moreover, while the windings 38 and 42 are depicted as being arranged at 90° to each other, other angular arrangements between 0° and 180° are possible. The actual angles between the windings need not be the same, and the angles may be selected based upon the number of windings in each pole array.

Figure 6:
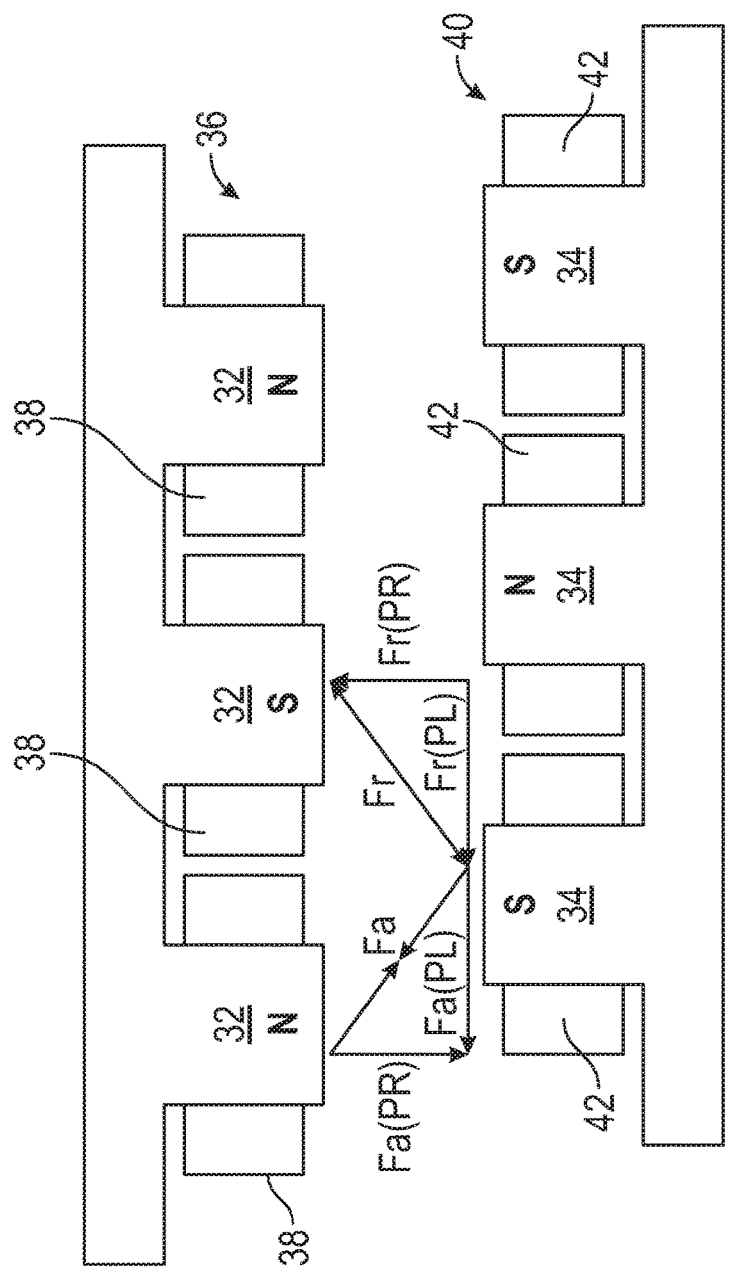
FIG. 6 is a schematic illustration of electro-magnetic forces acting between a rotor and a stator of an actuator in accordance with an embodiment depicted in FIG. 2.

With reference to FIG. 6, there is depicted the electromagnetic attraction (Fa) and repulsion (Fr) forces induced between the pole arrays 36 and 40 as a result of the selective energize of windings 38 and 42. The attraction and repulsion forces may be resolved into the component forces: Fa(PR)—the force component of magnetic attraction force F(a) perpendicular to the direction of movement; Fa(PL)—the force component of magnetic attraction force Fa parallel to the direction of movement; Fr(PR)—the force component of magnetic repulsion force Fr perpendicular to the direction of movement; Fr(PL)—the force component of magnetic repulsion force Fr parallel to the direction of movement. In general, the forces Fa(PL) and Fr(PL) being parallel to the direction of movement are preferred and the number, configuration and orientation of the pole arrays 36 and 30 is chosen to maximum the sum of these forces in the direction of movement. In contrast, the forces Fa(PR) and Fr(PR) do not contribute and the number, configuration and orientation of the pole arrays 36 and 30 is chosen to minimize or drive to zero the sum of these forces. However, it will be understood that in certain configurations some component of perpendicular forces may be retained to provide bearing loading, seal engagement or the like.

The physical arrangement of the pole arrays 36 and 40 as described may be specified to enhance forces contributing to movement of the rotor 18 relative to the stator 16. The ability to individually control each pole array 36 and 40 via controllers 50 and 52, and furthermore, the windings 38 and 42 of each pole array, may enhance this effect. That is, each pole array 36 and 40 may be selectively energized responsive to the controllers 50 and 52, respectively, so maximize the sum of the parallel forces Fa(PL) and Fr(PL) while minimizing or driving to zero the sum of the perpendicular forces Fa(PR) and Fr(PR).

Figure 7A:
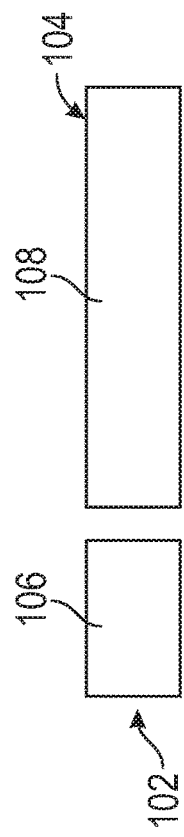
FIG. 7a-7d are graphic depictions of pole array arrangements in accordance with the herein described embodiments.
Figure 7B:
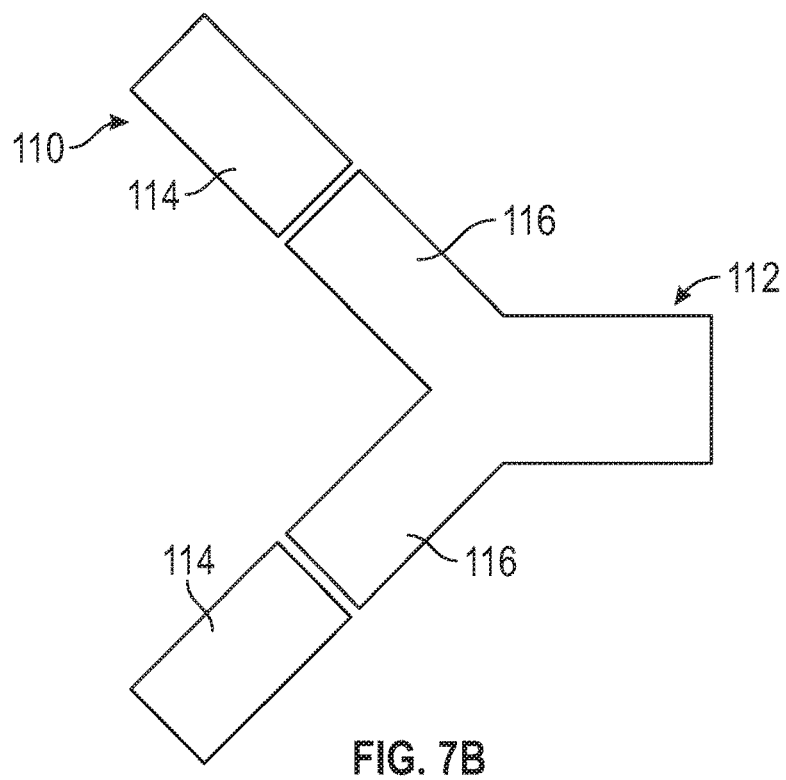
Figure 7C:
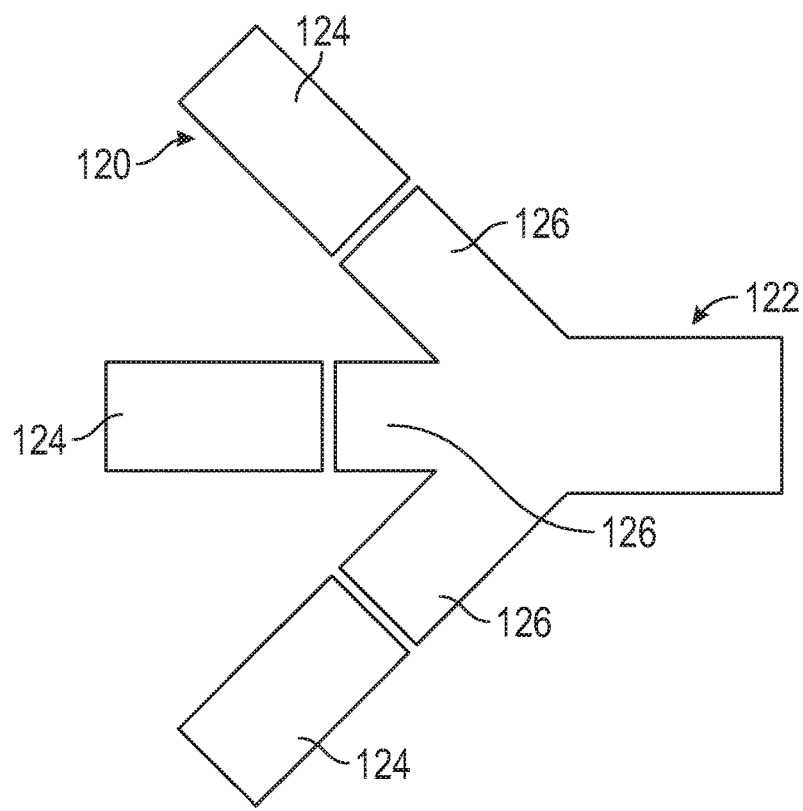
Figure 7D:
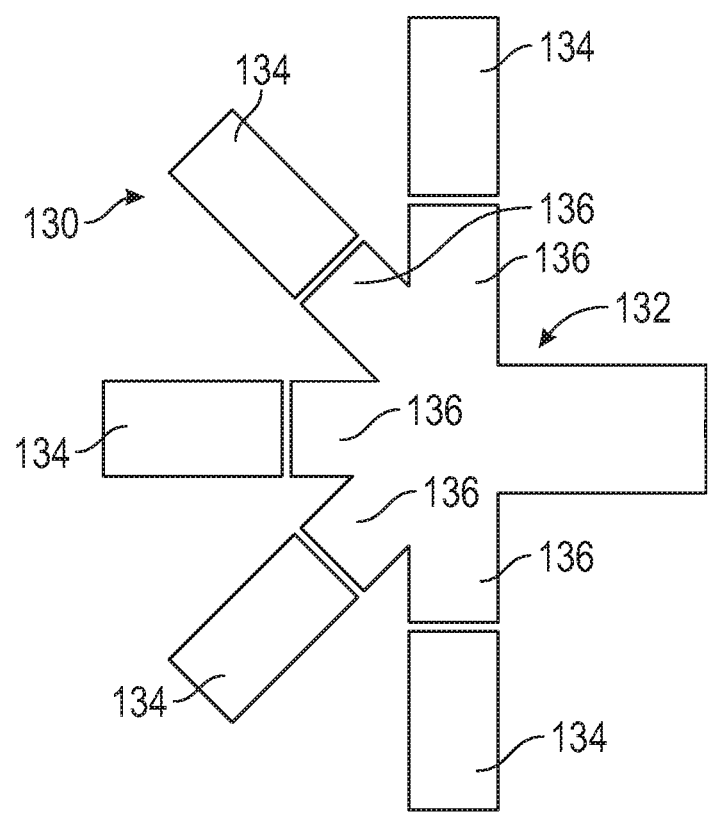

The embodiments of the actuator 14 depicted in FIGS. 2-4 utilize pole arrays 36 and 40 having a "T" configuration. FIGS. 7a-7d depict additional possible configurations of pole arrays. FIG. 7a depicts a stator pole array 102 and a rotor pole array 104, each having a single winding/core arrangement 106, 108, respectively. FIG. 7b depicts a variant that utilizes a stator pole array 110 and a rotor pole array 112, each having two winding/core arrangements 114 and 116 in a "Y" configuration. FIG. 7c depicts a variant that utilizes a stator pole array 120 and a rotor pole array 122, each having three winding/core arrangements 124 and 126 in a multi-pronged configuration. FIG. 7d depicts a variant that utilizes a stator pole array 130 and a rotor pole array 132, each having five winding/core arrangements 134 and 146 in a multi-pronged configuration. The pole arrays depicted in FIGS. 7a-7d are not exhaustive of all possible arrangements, but illustrate the many possible configurations to provide force balancing. One could realize pole arrays having four (4), six (6), seven (7), eight (8), nine (9), ten (10), eleven (11) or more winding/core arrangements by increasing the size of the actuator or decreasing the size of the individual pole arrays.

Figure 8:
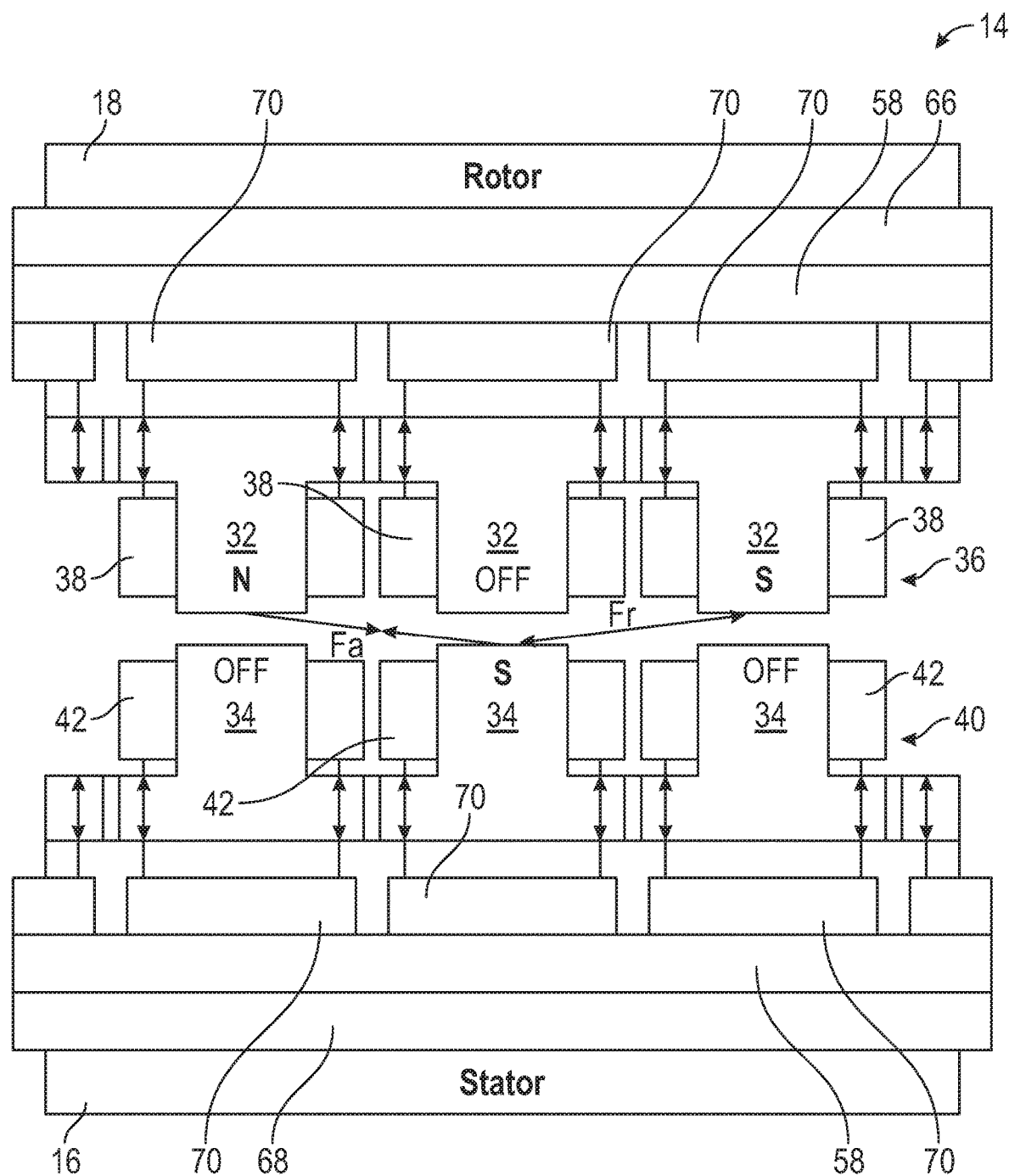
FIG. 8 is schematic illustration of control of an actuator in accordance with an embodiment depicted in FIG. 2 starting from a rest position.

The ability to individually control each pole array 36 and 40 via the controllers 50 and 52, respectively, provides an additional motor start advantage. Referring to FIG. 8, the rotor 18 is positioned relative to the stator 16 at rest with the pole arrays aligned. Energization of opposing pole arrays would not yield a parallel force component (Fa(PL) or Fr(PL)) sufficient to drive the rotor from rest. However, selective, non-adjacent pole arrays 36 and 40 may be energized (poles "N", "S" and "S") while other pole arrays are not energized (poles "off"). A result is attraction and repulsion forces, Fa and Fr, offset to cause movement of the rotor 18 relative to the stator 16.

In accordance with the herein described embodiments, methods of driving a driven structure relative to a base structure via an actuator are provided. A plurality of pole arrays is provided in association with a stator, and a complimentary plurality of pole arrays are provided in association with a rotor. Each of the pole arrays is individually controllable via an operatively coupled controller, where the controllers may selectively, individually energize the pole arrays to induce electromagnetic forces between the pole arrays to drive the rotor relative to the stator. Each of the pole arrays includes one or more windings, and the controllers may be configured to selectively energize the windings individually or collectively.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A direct drive actuator comprising:
a base structure;
a driven structure movable relative to the base structure;
a plurality of first pole arrays disposed on the base structure;
a plurality of second pole arrays, corresponding in number to the plurality of first pole arrays, disposed on the driven structure;
an electrical power source; and
a control unit including:
a controller operable to selectively control electrical power from the power source for energizing the plurality of first pole arrays and the plurality of second pole arrays;
a plurality of first pole controllers, wherein each of the plurality of first pole arrays is associated with and independently controlled by a different one of the plurality of first pole controllers; and
a plurality of second pole controllers, wherein each of the plurality of second pole arrays is associated with and independently controlled by a different one of the plurality of second pole controllers;
a network enabling communication between the controller, the plurality of first pole controllers and the plurality of second pole controllers;
wherein the controller is configured to send information over the network for instructing each of the plurality of first pole controllers to selectively energize and control a magnetically-induced force at the first pole array associated therewith independent of the other first pole arrays and for instructing each of the plurality of second pole controllers to selectively energize and control a magnetically-induced force at the second pole array associated therewith independent of the other second pole arrays such that an electro-magnetic force is generated between the plurality of first pole arrays and the plurality of second pole arrays for manipulating the driven structure relative to the base structure.

2. The direct drive actuator of claim 1, wherein each of the first pole arrays comprise a first plurality of windings and wherein each of the second pole arrays comprise a second plurality of windings, corresponding in number with the number of first plurality of windings.

3. The direct drive actuator of claim 1, wherein each of the first pole arrays comprise a plurality of first windings and wherein each of the second pole arrays comprise a plurality of second windings, different in number with the first plurality of windings.

4. The direct drive actuator of claim 3, wherein the plurality of first pole arrays are arranged at an angle from 0° to 180° with respect to each other, and the plurality of second pole arrays are arranged at an angle from 0° to 180° with respect to each other.

5. The direct drive actuator of claim 1, wherein the plurality of first pole arrays and the plurality of second pole arrays are disposed in fixed spatial relationship such that electro-magnetic force components not associated with translation of the driven structure are minimized.

6. The direct drive actuator of claim 1, wherein the plurality of first pole arrays and the plurality of second pole arrays are disposed in fixed spatial relationship such that electro-magnetic force components not associated with translation of the driven structure are canceled-out.

7. The direct drive actuator of claim 1, wherein the driven structure comprises a rotor and the base structure comprises a stator.

8. The direct drive actuator of claim 7, wherein the stator is circular and defines a cylindrical cavity, the rotor is circular and is disposed coaxial with the stator, the rotor includes a flange, the flange extending through an opening in the stator and into the cylindrical cavity, the plurality of first pole arrays being disposed on the flange and the plurality of second pole arrays being disposed on the stator within cylindrical cavity.

9. The direct drive actuator of claim 8, wherein the plurality of first pole arrays are disposed on the flange at a first interval and wherein the plurality of second pole arrays are disposed within the cylindrical cavity at a second interval corresponding to the first interval.

10. The direct drive actuator of claim 8, wherein an end of the flange is configured to have one of a "T", "Y" or multi-pronged shaped end, wherein in each configuration the flange includes a plurality of magnetically permeable arms, each of the first pole arrays comprise a plurality of windings corresponding in number to the number of arms, and one each of the plurality of windings is disposed on an arm.

11. The direct drive actuator of claim 10, the second pole arrays comprising a plurality of permeable cores corresponding in number to the plurality of arms, the plurality of cores being disposed within the cylindrical cavity in a configuration corresponding to the "T", "Y" or multi-pronged configuration of the end.

12. The direct drive actuator of claim 1, wherein the controller comprises a first controller disposed on the driven structure and a second controller disposed on the base structure, the first controller and the second controller being linked by a communication interface, wherein the first controller being coupled to the power source and to the plurality of first pole arrays and the second controller being coupled to the power source and to the plurality of second pole arrays, wherein the first controller and the second controller are configured to communicate via the communication interface to respectively electrically energize the plurality of first pole arrays and the plurality of second pole arrays such that the electro-magnetic force is formed between poles of the first plurality of pole arrays and poles of the second plurality of pole arrays.

13. The direct drive actuator of claim 12, wherein the communication interface comprises a data bus or a wireless data interface.

14. The direct drive actuator of claim 1, wherein the driven structure is configured for rotation relative to the base structure.

15. The direct drive actuator of claim 1, wherein the driven structure is configured for linear translation relative to the base structure.

16. The direct drive actuator of claim 1, further comprising a position encoder operatively coupled to the controller.

17. The direct drive actuator of claim 1, wherein the driven structure comprises one of a robot, a telescope, a crane, a radar dome, a tracking antenna array, a tracking solar array, a wind turbine, a weapon system and a piece of mining or construction equipment.

18. The direct drive actuator of claim 1, wherein the controller is configured to receive information over the network from the plurality of first pole controllers and the plurality of second pole controllers.

19. A direct drive actuator comprising:
  a first structure having a plurality of first pole arrays disposed thereon, each of the plurality of first pole arrays having a first coil and a first switching circuit associated with and configured to selectively energize the first coil;
  a second structure movable relative to the first structure and having a plurality of second pole arrays corresponding in number to the plurality of first pole arrays disposed thereon, each of the plurality of second pole arrays having a second coil and a second switching circuit associated with and configured to selectively energize the second coil;
  an electrical power source; and
  a control unit including:
    a first controller in communication with each of the first switching circuits to independently control electrical power from the electrical power source to each of the first coils, wherein the first controller is configured to send a first control signal to one or more of the first switching circuits for selectively energizing and controlling a magnetically-induced force of the first coil associated therewith independent of the other first coils; and
    a second controller in communication with each of the second switching circuits to independently control electrical power from the electrical power source to each of the second coils, wherein the second controller is configured to send a second control signal to one or more of the second switching circuits for selectively energizing and controlling a magnetically-induced force of the second coil associated therewith independent of the other second coils;
  wherein the plurality of first pole arrays and the plurality of second pole arrays, when selectively energized, generate an electro-magnetic force therebetween for manipulating the second structure relative to the first structure.

20. The direct drive actuator of claim 19, wherein the first controller is configured to receive first data signals from each of the first switching circuits and the second controller is configured to receive second data signals from the second switching circuits.

21. The direct drive actuator of claim 19 further comprising a third controller operably coupled to a network and configured to send and receive information with the first and second controllers.

* * * * *